No. 788,300. PATENTED APR. 25, 1905.
M. C. WILSON.
ADJUSTABLE WRENCH.
APPLICATION FILED JAN. 12, 1903.

Witnesses:
E. D. Goodwill
F. W. Kinsey

Inventor:
Melville Chalmers Wilson

No. 788,300. Patented April 25, 1905.

UNITED STATES PATENT OFFICE.

MELVILLE CHALMERS WILSON, OF OIL CITY, PENNSYLVANIA.

ADJUSTABLE WRENCH.

SPECIFICATION forming part of Letters Patent No. 788,300, dated April 25, 1905.

Application filed January 12, 1903. Serial No. 138,787.

*To all whom it may concern:*

Be it known that I, MELVILLE CHALMERS WILSON, a citizen of the United States, residing at Oil City, in the county of Venango and State of Pennsylvania, have invented a new and useful Quick-Action Adjustable Wrench, of which the following is a specification.

Figure 1:
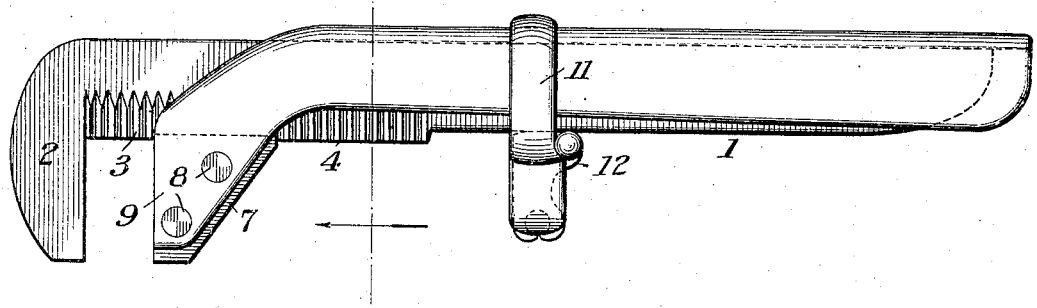
Figure 2:
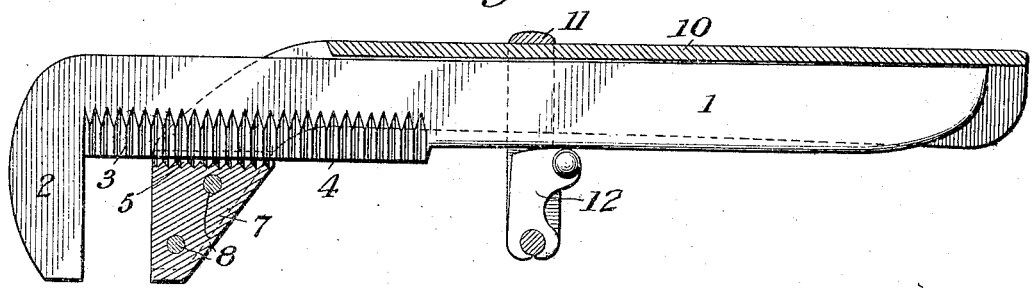
Figure 3:
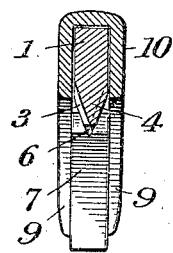
Figure 4:
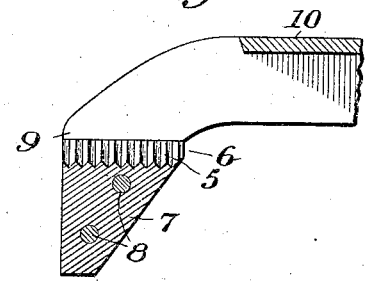

Figure 1 is a side view. Fig. 2 is a longitudinal section of the handle, showing the shank in proper relative position. Fig. 3 is a transverse section on line *x x*, Fig. 1. Fig. 4 is a view showing a portion of the handle, illustrating the jaw.

My invention relates to improvements in adjustable wrenches in which the adjustment to various sizes of nuts may be made in a quick and easy manner, thus saving time; and the objects of my improvements are, first, to provide a strong and rigid grip to the adjustment; second, to afford facilities for rapid adjustment to the various positions required to accommodate different sizes of nuts; third, to provide an extension of leverage to the handle as the size of the work increases; fourth, to provide a safe locking device to the adjusting mechanism; fifth, to attain these results in a simple and inexpensive manner. I attain these objects by the mechanism illustrated in the accompanying drawings, in which 1 is the shank, the head of which is turned downward at right angles, forming the solid jaw 2, in the rear of which and at the lower edge of shank 1 are a series of V-shaped teeth 3, formed on the sides of beveled or V-shaped bottom 4 of shank 1 in a manner to engage or match another series of V-shaped teeth 5, formed in V-shaped indenture 6 of block-jaw 7, which is rigidly fixed, by means of rivets 8, between the downward-curving lips 9 of handle 10, thus forming a combination of handle 10 and movable jaw 7. Encircling handle 10 and being fixed thereto, also encircling shank 1 at a point near the outward limit of V-shaped teeth 3, is a ring 11, which ring extends downward and below the bottom of shank 1, leaving an open aperture of a size to receive a swinging key 12 and space enough to drop the shank a sufficient distance to disengage teeth 3 and 5 to allow adjustment of jaws 2 and 7 by means of sliding shank 1 forward through the opening between lips 9 of handle 10. Finger-key 12 operates slidingly along bottom of shank 1 to lock said shank within handle 10 when adjustment is made, thus avoiding the possibility of slipping of teeth 3 and 5 while the wrench is being used.

From the foregoing description it will be apparent that a very effective wrench is obtained in which the adjustment may be quickly made from the narrowest to the widest limit by releasing the key 12, thus permitting the frame 10 and jaw 7 to rock out of engagement with the teeth 3 and slide along the shank 1 and clamp rigidly by simply swinging the cam-key forward slightly. It will also be seen that an extension of leverage is obtained as the size of the work is increased.

Changes in form or minor details of construction may be resorted to without departing from the spirit or sacrificing any of the advantages of this invention.

What I claim as my invention, and desire to secure by Letters Patent, is—

1. The combination of a shank provided with a jaw said shank having a V-shaped toothed edge, a handle provided with a jaw, said jaw and handle held in fixed relative position, the jaw provided with a V-shaped groove having teeth adapted to mesh with the teeth on the shank and means for holding the handle and shank in adjusted engagement with each other, substantially as and for the purpose set forth.

2. In an adjustable wrench the combination of a shank with V-shaped lower edge and V-shaped teeth thereon, and a block-jaw with V-shaped indenture, and V-notched teeth corresponding to and suitable to engage in V-teeth of the shank, of a handle curved or bent in a U shape over the top and embracing the sides of the shank, said handle being divided at forward part, with lips curving downward and embracing the sides of shank, and of the block-jaw, with jaw in proper position to engage V-shaped indenture astride V-shaped bottom of shank, and interlocking teeth thereof, to which jaw the curved lips of handle are rigidly fixed by means of rivets, substantially as shown.

MELVILLE CHALMERS WILSON.

Witnesses:
M. L. McGINNIS,
LUELLA McGINNIS.